(No Model.)

I. R. DOTSON.
WAGON BRAKE.

No. 579,475. Patented Mar. 23, 1897.

WITNESSES
INVENTOR
Isaac R. Dotson
by his Attys

THE NORRIS PETERS CO., PHOTO-LITHO., WASHINGTON, D. C.

UNITED STATES PATENT OFFICE.

ISAAC REUBEN DOTSON, OF DAYTON, OHIO.

WAGON-BRAKE.

SPECIFICATION forming part of Letters Patent No. 579,475, dated March 23, 1897.

Application filed January 20, 1897. Serial No. 619,927. (No model.)

*To all whom it may concern:*

Be it known that I, ISAAC REUBEN DOTSON, a citizen of the United States, residing at Dayton, in the county of Montgomery and State of Ohio, have invented certain new and useful Improvements in Wagon-Brakes; and I do hereby declare the following to be a full, clear, and exact description of the invention, such as will enable others skilled in the art to which it appertains to make and use the same.

My invention relates to brakes for vehicles, and is especially adapted for that type of brakes which are used on spring-wagons; and it consists of certain novel constructions, combinations, and arrangements of parts whereby the brake-lever will be automatically prevented from accidentally moving forward, but which will be free to be quickly operated when desired, and whereby the brake-lever can be held in contact with the rack-bar and thus hold the brake-shoe in engagement with the wheel.

Figure 1:
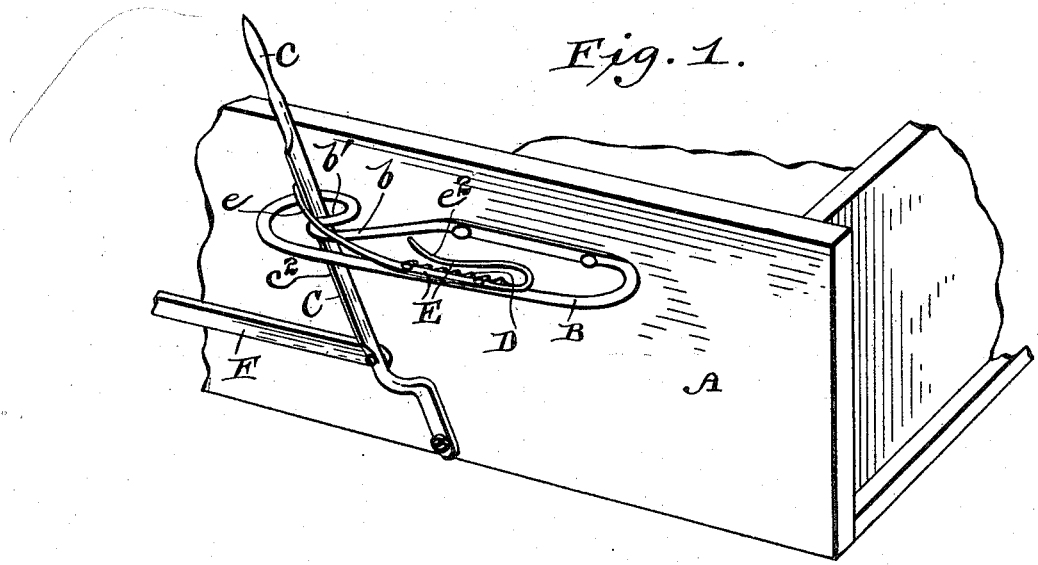
Figure 2:
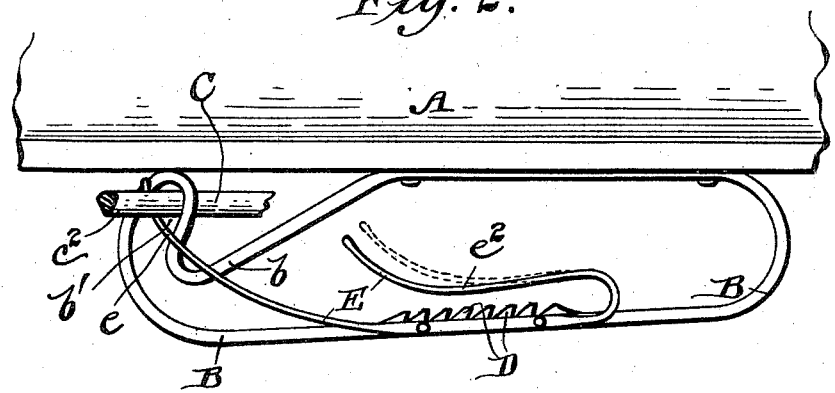

In the accompanying drawings, Figure 1 is a perspective view of a portion of a wagon with my improved brake applied to the same, and Fig. 2 is a top plan view of the same.

A in the drawings represents a wagon-body of ordinary construction to which my brake is applied.

B represents a metallic frame or body portion which is made in the form of an elongated loop and secured to the side of the wagon in any suitable manner. This looped frame portion is provided near its rear end with an inwardly-extending shoulder portion $b$, which forms a recess or detent $b'$ for the reception of the brake-operating lever C when the latter is drawn rearwardly. The brake-operating lever is pivoted at its lower end to the wagon-body and is bent outwardly and upwardly near its lower end, so that the lever can be easily passed over and around the shoulder portion $b$. Ratchet-teeth D are formed on the inner surface of the outer bar of the frame portion, so that they can be readily engaged by the brake-lever, which latter is formed with an angular portion $c^2$ near its middle to more readily engage the said ratchet-teeth.

E represents a peculiarly-shaped spring which is secured near its central portion to the outer bar of the frame B and extends rearwardly and forwardly in the form shown in the drawings. The rear portion of the spring is curved, as at $e$, so as to extend back of and around the brake-lever C when the latter is drawn backward, and rests in the detent or recess $b'$, so as to hold the same in such position and prevent the lever from accidentally moving forward. The other end of the spring is extended forward and then backward, as at $e^2$, near to the ratchet-teeth D, so as to hold the lever into positive engagement with said teeth and at the same time admitting of the lever being pushed forward or drawn backward by the operator when desired.

It will be observed that with my construction of spring it serves a double purpose—first, to hold the lever in a locked position when drawn backward and preventing the same accidentally moving forward, and, second, holding the lever in engagement with the ratchet-teeth, but admitting of the brake-lever being moved forward to apply the brake harder or to be drawn backward to release the same. An ordinary rod F connects the brake-lever with the brake-shoe, the latter not being shown.

The brake is very simple in its construction and operation and can be readily applied to wagons now in use without altering the construction of the same.

By the use of my invention the necessity of providing an auxiliary means for holding the lever backward to prevent the same accidentally being applied is obviated.

Having now described my invention, what I claim as new, and desire to secure by Letters Patent, is—

1. A brake for vehicles comprising in its construction a frame portion provided with ratchet-teeth and an inwardly-extending shoulder near its rear end forming a recess or detent for the reception of the brake-lever when the latter is drawn backward, a pivoted brake-lever, a spring attached to the frame of the brake and extending back and around the brake-lever when the latter is drawn backward for holding the same in place, and means connecting the brake-lever with the brake-shoe, substantially as described.

2. A brake for vehicles comprising in its construction a frame portion provided with ratchet-teeth and an inwardly-extending shoulder near its rear end forming a recess or detent for the reception of the brake-lever when the latter is drawn backward, a pivoted brake-lever, a spring attached to the frame of the brake and extending back and around the brake-lever when the latter is drawn backward for holding the same in place, and also extending forwardly and backwardly in close proximity to the ratchet-teeth on the brake-frame for holding the lever in engagement with the said teeth, and means connecting the brake-lever with the brake-shoe, substantially as described.

In testimony whereof I affix my signature in presence of two witnesses.

ISAAC REUBEN DOTSON.

Witnesses:
WEBSTER W. SHUEY,
NELLIE MCGRATH.